United States Patent [19]

Lynch

[11] Patent Number: 4,649,258

[45] Date of Patent: Mar. 10, 1987

[54] WATER TREATMENT FOR WATER INJECTION PLASMA ARC CUTTING APPARATUS

[76] Inventor: James E. Lynch, 115 S. Harrison Ave., Pittsburgh, Pa. 15202

[21] Appl. No.: 779,936

[22] Filed: Sep. 25, 1985

Related U.S. Application Data

[63] Continuation-in-part of Ser. No. 488,353, Apr. 25, 1983, abandoned.

[51] Int. Cl.⁴ .............................................. B23K 15/00
[52] U.S. Cl. ...................... 219/121 PY; 219/121 PN; 219/61.7
[58] Field of Search ........ 219/121 P, 121 PR, 121 PP, 219/121 PN, 121 PY, 61.7; 422/15–18; 252/187, 389 A

[56] References Cited

U.S. PATENT DOCUMENTS

| | | | |
|---|---|---|---|
| 3,965,027 | 6/1965 | Boffardi et al. | 252/180 |
| 4,351,796 | 9/1982 | Marshall | 422/15 |
| 4,455,470 | 6/1984 | Klein et al. | 219/121 PN |
| 4,472,283 | 9/1984 | Brooks | 210/698 |

*Primary Examiner*—M. H. Paschall
*Attorney, Agent, or Firm*—Buell, Ziesenheim, Beck & Alstadt

[57] ABSTRACT

The service life of torches used for water injection plasma arc cutting and like water cooled devices is increased by treating cooling and injection water of high dissolved solids content so as to lower the dissolved solids content of the water until its Ryznar Stability Index is in the range of about 5.5 to about 7.5.

2 Claims, No Drawings

WATER TREATMENT FOR WATER INJECTION PLASMA ARC CUTTING APPARATUS

This application is a continuation-in-part of my application Ser. No. 488,353, filed Apr. 25, 1983, now abandoned.

This invention relates to water injection plasma arc cutting of metals and the like. It is more particularly concerned with a method of lengthening plasma torch life by treatment of the cooling and injection water.

BACKGROUND OF THE INVENTION

Water injection plasma arc cutting is used for cutting steel and non-ferrous metal plates for many applications. The plate to be cut is usually supported on a horizontal table and may be covered by two or three inches of water. The cutting torch is mounted above the table and projects a swirling jet of hot plasma of confined area through a metal nozzle onto the plate. The plasma is an ionized gas containing about equal numbers of positive ions and electrons. Water is pumped into the plasma torch to cool it and then is injected against the plasma for further constriction of the arc. A drawback of the process is that torch nozzle life is short. The narrow water passages in the nozzle tend to distort, which not only reduces the cooling efficiency of the water but causes alteration in the flow pattern of the swirling gas. Water hardness has been blamed for this difficulty. Where water hardness is as high as 35 grains per gallon, measured as calcium carbonate ($CaCo_3$), nozzle life of only a few minutes has been observed. Prior to my invention to be described hereinafter water injection plasma arc cutting torch users have been advised to soften the water supplied to the plasma torch, even when the hardness is as low as 7 grains per gallon. However, such treatment produces only moderate improvement, if any, in torch operation.

SUMMARY OF THE INVENTION

I have found that while the water softness or hardness is a factor to be considered as far as under water plasma cutting torch nozzle life is concerned, another factor also requires consideration, specifically, the total dissolved solids in the water at the temperature of its use. The temperature at the tip of the torch nozzle is very high and I have now found the heat there dissipated causes the cooling water injected against the plasma to evaporate leaving the solids carried by the water as a deposit around the nozzle. It is that deposit which is primarily responsible for the distortion of the water passages in the torch. In my process, I lower the dissolved solids of the water introduced into the torch for cooling purposes. In addition, the supply water may be either scale forming or corrosive and I adjust its tendency if necessary. The various factors above mentioned are known to be interdependent. Langelier's Index, which is derived graphically from experimental data, is one way of expressing that dependency. That index is obtained by subtracting from the pH of the water a saturation index pH, written pHs, which is the sum of the experimental values of Ca hardness, as Ca-$CaO_3$, total alkalinity as $CaCO_3$, and a parameter varying from about 1.10 to 2.9 related to the solids concentration at the temperature of the water. All three of the terms subtracted are positive, but the difference between the water pH and pHs may be either negative, indicating corrosive water, or positive, indicating scale forming water. An empirical measure of the scaling tendency of water is Ryznar's Stability Index (RSI), which equals 2 pHs−pH.

DESCRIPTION OF PREFERRED EMBODIMENT

In my process I lower the dissolved solids content of the cooling water, preferably by reverse osmosis. Apparatus for that purpose is commercially available, from Medlo Systems, Inc. of 1305 Summit Avenue, Suite 1, Plano, Tex. 75074. The apparatus makes use of membranes of a selected pore size which may range from about 5 to about 20 angstrom units. The raw water is forced against the membrane under pressure and the particles which will not pass through the pores are carried off by a stream of water running across the membrane. Lowering the total dissolved solids contents of the cooling water raises its RSI. I prefer to maintain the RSI between 6 and 7 which is indicative of truly neutral water. When it is necessary to reduce the RSI, it is conveniently done by mixing "hard" water with the supply water in the amount desired, or by adjusting its alkalinity, or by adding a granular salt thereto.

The corrosiveness of soft water is somewhat relative in that different metals are attacked in different degrees by the same water, and torches and nozzles of the same metal but of different structures are also affected somewhat differently by the same water. It is desirable for any installation to vary the RSI of the torch water around the nominal neutral region and to operate with as high an RSI value as the effect of that water on the torch will permit.

Sodium zeolite water softeners can change the RSI value of water by merely exchanging calcium, magnesium, iron, etc., ions for sodium ions; however, no control is provided and an overly corrosive water may result. The sodium based sludge they produce is slower to form a hard scale than the deposits from harder water. The softer deposit eventually distorts the torch water passages, however, but before that happens the deposit may alter the flow of the cut water to the nozzle so as to affect unfavorably the swirling flow of the plasma, thus impairing the operation of the torch.

I have found that in my process the service life of water injection plasma arc torches and nozzles can be increased to as much as seven times that with untreated water. Satisfactory service life for most metals is generally found within an RSI range of 5.5 to 7.5, depending on the metal.

In the foregoing specification I have described a presently preferred embodiment of my invention; however, it will be understood that my invention can be otherwise embodied within the scope of the following claims.

I claim:

1. The process of treating by reverse osmosis raw cooling water containing dissolved solids for a metal underwater plasma arc cutting torch or the like to increase the service life of said torch comprising:
   (a) determining from a representative raw water sample the total dissolved solids content of said sample;
   (b) calculating the potential corrosiveness or scale forming tendency of said raw water as measured by Langelier's Index, Ryznar's stability Index, or both;
   (c) determining from (a) and (b) the reverse osmosis membrane or membranes necessary for maintaining the Ryznar's Stability Index of the treated water within the range of about 5.5–7.5.

2. The process of claim 1 in which the step (b) also includes calculating the quantity of acid or alkaline modifying substance required, if any.

* * * * *